US008846783B2

(12) United States Patent
Rathschlag et al.

(10) Patent No.: US 8,846,783 B2
(45) Date of Patent: Sep. 30, 2014

(54) PIGMENT GRANULES

(75) Inventors: Thomas Rathschlag, Riedstadt (DE); Carsten Griessmann, Gross-Zimmern (DE)

(73) Assignee: Merck Patent GmbH, Darmstadt (DE)

( * ) Notice: Subject to any disclaimer, the term of this patent is extended or adjusted under 35 U.S.C. 154(b) by 440 days.

(21) Appl. No.: 13/140,644

(22) PCT Filed: Dec. 18, 2009

(86) PCT No.: PCT/EP2009/009117
§ 371 (c)(1),
(2), (4) Date: Jun. 17, 2011

(87) PCT Pub. No.: WO2010/072379
PCT Pub. Date: Jul. 1, 2010

(65) Prior Publication Data
US 2011/0251303 A1    Oct. 13, 2011

(30) Foreign Application Priority Data
Dec. 22, 2008  (DE) .......................... 10 2008 064 202

(51) Int. Cl.
| C09D 5/29 | (2006.01) |
| C09C 1/00 | (2006.01) |
| C09D 5/03 | (2006.01) |
| C09D 5/36 | (2006.01) |
| C09C 3/04 | (2006.01) |

(52) U.S. Cl.
CPC .......... *C09C 3/045* (2013.01); *C09C 2200/1004* (2013.01); *C01P 2004/61* (2013.01); *C09C 1/0024* (2013.01); *C09D 5/032* (2013.01); C09C 2200/302 (2013.01); C09C 2200/1054 (2013.01); C09C 2200/301 (2013.01); *C09D 5/36* (2013.01); C09C 2200/102 (2013.01); C09C 1/0081 (2013.01)
USPC ........... 523/171; 524/107; 524/323; 524/414; 524/585

(58) Field of Classification Search
USPC .................. 523/171; 524/107, 323, 414, 585
See application file for complete search history.

(56) References Cited

U.S. PATENT DOCUMENTS

| 3,087,828 | A | * | 4/1963 | Linton ........................... 106/417 |
| 4,116,628 | A | | 9/1978 | Hesse |
| 4,482,389 | A | | 11/1984 | Franz |
| 4,490,179 | A | | 12/1984 | Bernhard |
| 4,494,993 | A | | 1/1985 | Bernhard |
| 4,544,415 | A | | 10/1985 | Franz |
| 5,176,751 | A | * | 1/1993 | Findley .......................... 106/502 |
| 5,182,326 | A | * | 1/1993 | LeBlanc et al. ............... 524/514 |
| 5,393,714 | A | | 2/1995 | Thometzek |
| 5,455,288 | A | * | 10/1995 | Needham ....................... 523/205 |
| 5,571,851 | A | | 11/1996 | Freeman |
| 5,688,449 | A | * | 11/1997 | Fox ................................... 264/54 |
| 5,759,255 | A | | 6/1998 | Venturini |
| 6,451,102 | B1 | | 9/2002 | Hilder |
| 6,761,762 | B1 | | 7/2004 | Greiwe |
| 7,365,109 | B2 | * | 4/2008 | Rathschlag et al. ........... 523/171 |
| 2002/0098435 | A1 | | 7/2002 | Rohr |
| 2003/0176536 | A1 | * | 9/2003 | Rathschlag et al. ........... 523/171 |
| 2005/0113487 | A1 | | 5/2005 | Willard et al. |
| 2005/0143493 | A1 | | 6/2005 | Kieser |
| 2005/0255264 | A1 | * | 11/2005 | Maziers ....................... 428/35.7 |
| 2006/0223932 | A1 | * | 10/2006 | Kieser et al. .................. 524/449 |
| 2007/0022907 | A1 | | 2/2007 | Becker |
| 2010/0179256 | A1 | | 7/2010 | Kling |

FOREIGN PATENT DOCUMENTS

| DE | 2215191 | 10/1972 |
| DE | 2603211 | 8/1977 |
| DE | 3151354 | 7/1983 |
| DE | 3235017 | 3/1984 |
| DE | 3334598 | 4/1985 |
| DE | 102006039913 | 2/2008 |
| EP | 0090259 | 10/1983 |
| EP | 0606592 | 7/1994 |
| EP | 0634459 | 1/1995 |
| EP | 1520876 | 4/2005 |
| GB | 1348878 | 3/1974 |
| JP | 09 241390 | 9/1997 |
| JP | 10 279877 | 10/1998 |
| JP | 2004 533534 | 11/2004 |
| JP | 07 514020 | 5/2007 |
| WO | 9632446 | 10/1996 |

(Continued)

OTHER PUBLICATIONS

"Precision Molded Foam Conversion Chart." Tempo can produce beads in these ranges using corresponding mechanical mesh screens. Retrieved online [Nov. 1, 2011]. Retrieved from the internet <http://www.temp_foam.com/engineering/conversion_charts>.*

(Continued)

*Primary Examiner* — Hannah Pak
(74) *Attorney, Agent, or Firm* — RatnerPrestia

(57) ABSTRACT

Pigment granules comprise one or more flake-form effect pigments, polymer particles or polymer particle mixtures, adhesion promoters, antioxidants and optionally additives. A process for the preparation of pigment granules comprises mixing one or more flake-form effect pigments, one or more polymer particles, at least one adhesion promoter, at least one antioxidant and optionally one or more additives with one another simultaneously or successively. The pigment granules may be used for the pigmentation of powder coatings, plastics and for the preparation of masterbatches. The pigment granules may be employed as a mixture with plastic powders or as a mixture with plastic granules for use in masterbatch applications.

15 Claims, No Drawings

(56) References Cited

FOREIGN PATENT DOCUMENTS

| WO | 9957204 | 11/1999 |
| WO | 0192425 | 12/2001 |
| WO | WO 03/004570 | 1/2003 |
| WO | 2005019327 | 3/2005 |
| WO | 2005052076 | 6/2005 |

OTHER PUBLICATIONS

International Search Report for WO2010/072379, mailed Feb. 24, 2010.

* cited by examiner

PIGMENT GRANULES

CROSS-REFERENCE TO RELATED APPLICATIONS

This application is a United States national phase application of International Application No. PCT/EP2009/009117, filed Dec. 18, 2009, which claims priority of DE102008064202.0, filed Dec. 22, 2008, which applications are incorporated herein by reference in their entirety for all purposes.

FIELD OF THE INVENTION

The present invention relates to pigment granules comprising one or more flake-form effect pigments, and to the use thereof for the pigmentation of application media, for example powder coatings and in particular plastics, and for the preparation of masterbatches.

BACKGROUND OF THE INVENTION

The flow behaviour of pigments based on flake-form substrates, such as, for example, mica flakes, is frequently unsatisfactory. In a multiplicity of applications, in particular in the printing and paints sector, this does not result in major problems. On incorporation into plastics, however, the poor flow behaviour of these pigments proves to be particularly problematic.

In addition, pronounced evolution of dust occurs during the processing of pearlescent pigments, for example in the preparation of masterbatches, which requires increased equipment complexity for elimination of the dusts and for cleaning of the machines.

It is known per se to coat pigments with organic components in order to simplify incorporation of the pigments, for example into plastics, powder coatings, toners, etc. Processes of this type for the preparation of pigment compositions and pigment-containing granules are known, for example, from DE 26 03 211, WO 2005/052076, WO 2005/019327 and U.S. 2002/0098435 A1.

The mechanical properties of effect pigments based on flake-form substrates are frequently very unsatisfactory, which is evident in the form of dusty abraded material owing to fracture of the pigments and loss of adhesion of the coating from the support substrate in the form of delamination. A further problem is the increase in throughput in the extrusion process on incorporation of pigment-containing compositions into plastics. The compositions from the prior art are frequently distinguished by inadequate oxidation stability.

Furthermore, however, it has been found that the pigment granules known from the prior art comprising >50% of effect pigments and an organic polymer are frequently not oxidation-stable and tend towards dangerous spontaneous heating, although pigment granules of this type should not be classified as readily combustible solids (in accordance with test procedure A.10. Combustibility of Solid Substances in the Official Journal of the European Communities No. L 383 A/76 of Dec. 29, 1992).

SUMMARY OF THE INVENTION

An object of the present invention is therefore the provision of non-dusting pigment granules which can be incorporated very well into application media, in particular into polyolefin plastics, and at the same time exhibit no tendency towards dangerous spontaneous heating.

Surprisingly, it has now been found that pigment granules comprising one or more flake-form effect pigments, polymer particles, at least one adhesion promoter, at least one antioxidant and optionally additives are very suitable for use, in particular in plastics, and can also be employed very well in the preparation of masterbatches. In addition, these pigment granules are protected against spontaneous combustion.

The present invention therefore relates to pigment granules which are distinguished by the fact that they comprise one or more flake-form effect pigments, polymer particles, at least one adhesion promoter, at least one antioxidant and optionally additives.

The effect pigment here is preferably adhesively bonded to the surface by means of the polymer particle or partially or completely coated therewith.

Pigment granules of this type exhibit a significantly reduced tendency towards spontaneous combustion and, owing to their good flow properties, are particularly suitable for the pigmentation of plastics and in the preparation of masterbatches.

The present invention furthermore relates to a process for the preparation of the pigment granules according to the invention, in which one or more flake-form effect pigments, one or more polymer particles, at least one adhesion promoter and optionally additives are mixed simultaneously or successively.

The pigment granules according to the invention prove to be particularly advantageous for incorporation into plastics. In addition, the pigment granules according to the invention are non-dusting and are very readily free-flowing, which reduces the equipment complexity for the processing thereof. In addition, the throughput can be increased at least by a factor of 2-5 compared with the untreated pigment, depending on the conditions, on use of the pigment granules according to the invention in a twin-screw extruder. Furthermore, masterbatches having an effect-pigment content of up to 50% by weight, based on the masterbatch, can be prepared in a single-screw extruder using the pigment granules according to the invention.

Besides the effect pigment, the essential constituent of the pigment granules according to the invention is the polymer particles.

The polymer particles preferably consist of polyolefins, in particular of polyethylene (PE) and polypropylene (PP). Very particular preference is given to LLD-PE plastics (LLD: linear low density), as commercially available, for example, from ExxonMobil under the trade name Escorene LL6101 XR as plastic pellets or Escorene LL6101 RQ as plastic powder.

The polymer particles preferably have a particle size of 0.5-6 mm, in particular 0.5-5 mm and very particularly preferably 0.8-4 mm. The polymer particles are generally spherical.

The commercially available plastic powders frequently have particle sizes of 0.5-1.5 mm or plastic pellets frequently have particle sizes of 3-6 mm. These polymer particles must then be melted in advance for use in the preparation of the pigment composition according to the invention and then adjusted to the desired particle size, for example by granulation, for example underwater granulation, and adjustment of the grain size, for example by means of a perforated disc.

It is also possible to employ mixtures of different polymer particles, i.e. both polymer materials of different size and also support materials made from different materials, for example
- mixtures of polymer particles of different particle size
- mixtures of polymer particles of different chemical structure and thermoplastic structure.

Suitable adhesion promoters are preferably wax emulsions, commercially available, for example, from KEIM ADDITEC Surface GmbH. Suitable wax emulsions are, for example, LD-PE wax emulsions (LD=low density), for example Ultralube V-06070480 from KEIM ADDITEC Surface GmbH. The wax emulsions preferably comprise emulsion particles having a size of 20-100 nm. The suitable wax emulsions preferably have a melting range of 70-160° C., in particular 80-140° C. and very particularly preferably 90-130° C. The wax emulsions are particularly preferably those selected from the group of HD-PE (HD=high density), LD-PE (LD=low density), LLD-PE (LLD=linear low density), VLD-PE (VLD=very low density) and PP wax emulsions.

The proportion of adhesion promoter in the pigment granules according to the invention is preferably 1-30% by weight, in particular 5-20% by weight, very particularly preferably 7.5-15% by weight, based on the total weight of the granules.

DETAILED DESCRIPTION OF THE INVENTION

In the pigment granules according to the invention, the effect pigments, the antioxidant, the polymer particles, the adhesion promoters and optionally additives are in the form of a mixture with one another. The effect pigment and the polymer particles are preferably at least partially or completely coated or sheathed by the adhesion promoters. Complete sheathing with and "adhesive bonding" of the flake-form effect pigment and the polymer particles to the adhesion promoter are very particularly preferred.

The wax emulsions employed should preferably have particle sizes of 10-100 nm. Particle sizes >100 nm frequently do not result in the same adhesion primer properties, since in particular the mechanical properties, such as adhesion and abrasion stability, become worse or increase.

The possibility of bonding the surface of the pigments to the finely divided emulsion particles of the wax emulsion after drying thereof and anchoring the surface of the pigments to the polymer particles decreases with increasing particle size of the wax-emulsion particles.

The flake-form effect pigments are preferably pearlescent pigments, interference pigments, metal-effect pigments, multilayered pigments having transparent, semitransparent and/or opaque layers, holographic pigments, goniochromatic pigments, coated or uncoated BiOCl flakes and/or LCP pigments.

Pearlescent pigments, interference pigments, metal-effect pigments or multilayered pigments having transparent, semitransparent and/or opaque layers which can be employed in accordance with the present invention are based, in particular, on supports, which are preferably in flake form. For example, flake-form $TiO_2$, synthetic mica (for example fluorophlogopite) or natural mica, talc, kaolin, doped or undoped glass flakes, metal flakes, flake-form $SiO_2$, flake-form $Al_2O_3$ or flake-form iron oxide are suitable. The metal flakes can consist, inter alia, of aluminium, titanium, bronze, steel or silver, preferably aluminium and/or titanium. The metal flakes here may be passivated by corresponding treatment. The glass flakes can consist of all glass types known to the person skilled in the art, for example of A glass, E glass, C glass, ECR glass, recycled glass, window glass, borosilicate glass, Duran® glass, labware glass or optical glass. The refractive index of the glass flakes is preferably 1.45-1.80, in particular 1.50-1.70. The glass substrates particularly preferably consist of C glass, ECR glass or borosilicate glass.

In a preferred embodiment, the support may be coated with one or more transparent semitransparent and/or opaque layers comprising metal oxides, metal oxide hydrates, metal suboxides, metals, metal fluorides, metal nitrides, metal oxynitrides or mixtures of these materials. The metal oxide, metal oxide hydrate, metal suboxide, metal, metal fluoride, metal nitride, metal oxynitride layers or mixtures thereof can have a low refractive index (refractive index<1.8) or a high refractive index (refractive index≥1.8). Suitable metal oxides and metal oxide hydrates are all metal oxides or metal oxide hydrates known to the person skilled in the art, such as, for example, aluminium oxide, aluminium oxide hydrate, silicon oxide, silicon oxide hydrate, iron oxide, tin oxide, cerium oxide, zinc oxide, zirconium oxide, chromium oxide, titanium oxide, in particular titanium dioxide, titanium oxide hydrate and mixtures thereof, such as, for example, ilmenite or pseudobrookite. Metal suboxides which can be employed are, for example, the titanium suboxides. Suitable metals are, for example, chromium, aluminium, nickel, silver, gold, titanium, copper or alloys, a suitable metal fluoride is, for example, magnesium fluoride. Metal nitrides or metal oxynitrides which can be employed are, for example, the nitrides or oxynitrides of the metals titanium, zirconium and/or tantalum. The support is preferably coated with metal oxide, metal, metal fluoride and/or metal oxide hydrate layers and very particularly preferably metal oxide and/or metal oxide hydrate layers. Furthermore, multilayered structures comprising high- and low-refractive-index metal oxide, metal oxide hydrate, metal or metal fluoride layers may also be present, in which case high- and low-refractive-index layers preferably alternate. Particular preference is given to layer packages comprising a high-refractive-index layer and a low-refractive-index layer, where one or more of these layer packages may be applied to the support. The sequence of the high- and low-refractive-index layers can be matched to the support here in order to incorporate the support into the multilayered structure. In a further embodiment, the metal oxide, metal oxide hydrate, metal suboxide, metal, metal fluoride, metal nitride or metal oxynitride layers may be mixed or doped with colorants or other elements. Besides the effect pigments, suitable further colorants are, for example, organic or inorganic coloured pigments, such as coloured metal oxides, for example magnetite, chromium oxide or coloured pigments such as, for example, Berlin Blue, ultramarine, bismuth vanadate, Thénard's Blue, or alternatively organic coloured pigments, such as, for example, indigo, azo pigments, phthalocyanines or also Carmine Red, or elements such as, for example, yttrium or antimony. Effect pigments comprising these layers exhibit high colour variety with respect to their mass tone and can in many cases exhibit an angle-dependent change in the colour (colour flop) due to interference.

In a preferred embodiment, the outer layer on the support is a high-refractive-index metal oxide. This outer layer may be in addition to the above-mentioned layer packages or, in the case of high-refractive-index supports, part of a layer package and consist, for example, of $TiO_2$, titanium suboxides, $Fe_2O_3$, $Fe_3O_4$, $SnO_2$, $ZnO$, $ZrO_2$, $Ce_2O_3$, $CoO$, $CO_3O_4$, $V_2O_5$, $Cr_2O_3$ and/or mixtures thereof, such as, for example, ilmenite or pseudobrookite. $TiO_2$ is particularly preferred, furthermore $Fe_2O_3$. If the support flakes are coated with $TiO_2$, the $TiO_2$ is preferably in the rutile modification, furthermore in the anatase modification.

Particularly preferred effect pigments have the following structure:

substrate flake+(SiO$_2$)+TiO$_2$ (rutile)

substrate flake+(SiO$_2$)+Fe$_2$O$_3$ substrate flake+(SiO$_2$)+Fe$_3$O$_4$ substrate flake+(SiO$_2$)+SiO$_2$+TiO$_2$ (rutile)

substrate flake+(SiO$_2$)+TiO$_2$(rutile)+SiO$_2$+TiO$_2$ (rutile)

substrate flake+(SiO$_2$)+TiO$_2$(anatase)+SiO$_2$+TiO$_2$ (anatase)

substrate flake+(SiO$_2$)+TiO$_2$/Fe$_2$O$_3$+SiO$_2$+TiO$_2$+TiO$_2$/Fe$_2$O$_3$ substrate flake+(SiO$_2$)+TiO$_2$/Fe$_2$O$_3$+SiO$_2$+TiO$_2$/Fe$_2$O$_3$.

An SiO$_2$ layer may optionally be applied to the substrate flake as protective layer. If the substrate flake is a glass flake, the application of an SiO$_2$ layer is frequently advisable in order to protect the glass flake against leaching-out in the case of wet-chemical coating.

In this patent application, "high-refractive-index" means a refractive index of ≥1.8, while "low-refractive-index" means a refractive index of <1.8.

The thickness of the metal oxide, metal oxide hydrate, metal suboxide, metal, metal fluoride, metal nitride or metal oxynitride layers or a mixture thereof is usually 3 to 300 nm and, in the case of the metal oxide, metal oxide hydrate, metal suboxide, metal fluoride, metal nitride or metal oxynitride layers or a mixture thereof, preferably 20 to 200 nm. The thickness of the metal layers is preferably 4 to 50 nm.

The size of the supports and thus of the effect pigments is not crucial per se. Flake-form supports and/or flake-form supports coated with one or more transparent or semitransparent metal oxide, metal or metal fluoride layers generally have a thickness of between 0.05 and 5 μm, in particular between 0.1 and 4.5 μm. The length and width dimension is usually between 1 and 500 μm, preferably between 2 and 200 μm and in particular between 2 and 100 μm.

Very particularly preferred effect pigments have the following layer structure:

mica flake+TiO$_2$ mica flake+TiO$_2$+Fe$_2$O$_3$ mica flake+TiO$_2$/Fe$_2$O$_3$ mica flake+Fe$_2$O$_3$ mica flake+Fe$_3$O$_4$ mica flake+titanium oxynitrides mica flake+TiO$_2$+SiO$_2$+TiO$_2$ mica flake+TiO$_2$/Fe$_2$O$_3$ mica flake+TiO$_2$/Fe$_2$O$_3$+SiO$_2$+TiO$_2$ mica flake+TiO$_2$/Fe$_2$O$_3$+SiO$_2$+TiO$_2$/Fe$_2$O$_3$ mica flake+TiO$_2$/Fe$_2$O$_3$+SiO$_2$+TiO$_2$+TiO$_2$/Fe$_2$O$_3$ mica flake+TiO$_2$+SiO$_2$+TiO$_2$/Fe$_2$O$_3$ mica flake+TiFe$_2$O$_5$ Al$_2$O$_3$ flake+TiO$_2$ Al$_2$O$_3$ flake+Fe$_2$O$_3$ Al$_2$O$_3$ flake+titanium oxynitrides SiO$_2$ flake+TiO$_2$ SiO$_2$ flake+Fe$_2$O$_3$ SiO$_2$ flake+titanium oxynitrides glass flake+TiO$_2$ glass flake+Fe$_2$O$_3$ glass flake+TiO$_2$+Fe$_2$O$_3$ glass flake+SiO$_2$+TiO$_2$ glass flake+SiO$_2$+Fe$_2$O$_3$ glass flake+SiO$_2$+TiO$_2$+Fe$_2$O$_3$ glass flake+SiO$_2$+TiO$_2$+SiO$_2$ glass flake+TiO$_2$+SiO$_2$+TiO$_2$ glass flake+TiO$_2$/Fe$_2$O$_3$ glass flake+TiO$_2$/Fe$_2$O$_3$+SiO$_2$+TiO$_2$ glass flake+TiO$_2$/Fe$_2$O$_3$+SiO$_2$+TiO$_2$/Fe$_2$O$_3$ glass flake+TiO$_2$/Fe$_2$O$_3$+SiO$_2$+TiO$_2$+TiO$_2$/Fe$_2$O$_3$ glass flake+TiO$_2$+SiO$_2$+TiO$_2$/Fe$_2$O$_3$ glass flake+TiFe$_2$O$_5$ glass flake+SiO$_2$+TiO$_2$/Fe$_2$O$_3$ glass flake+SiO$_2$+TiO$_2$/Fe$_2$O$_3$+SiO$_2$+TiO$_2$ glass flake+SiO$_2$+TiO$_2$/Fe$_2$O$_3$+SiO$_2$+TiO$_2$/Fe$_2$O$_3$ glass flake+SiO$_2$+TiO$_2$/Fe$_2$O$_3$+SiO$_2$+TiO$_2$+TiO$_2$/Fe$_2$O$_3$ glass flake+SiO$_2$+TiO$_2$+SiO$_2$+TiO$_2$/Fe$_2$O$_3$ glass flake+SiO$_2$+TiFe$_2$O$_5$ Fe$_2$O$_3$ flake+TiO$_2$ Fe$_2$O$_3$ flake+Fe$_2$O$_3$ Fe$_2$O$_3$ flake+titanium oxynitrides metal flake (optionally passivated)+TiO$_2$ metal flake (optionally passivated)+Fe$_2$O$_3$.

TiO$_2$/Fe$_2$O$_3$ means that TiO$_2$ and Fe$_2$O$_3$ are present in a layer as a mixture and/or as a mixed oxide in the form of pseudobrookite. The pseudobrookite or the TiO$_2$/Fe$_2$O$_3$ mixed layer may optionally also be doped with Al$_2$O$_3$.

Suitable effect pigments are commercially available, for example from BASF Corp., for example under the trade names Firemist®, Rightfit™, Magnapearl®, from Merck KGaA under the trade names Iriodin®, Miraval®, Xirallic® and Colorstream®.

In this patent application, effect pigments are taken to mean those pigments selected from the group consisting of pearlescent pigments, interference pigments, metal-effect pigments, multilayered pigments having transparent, semi-transparent layers, opaque layers, goniochromatic pigments, holographic pigments, coated BiOCl flakes, uncoated BiOCl flakes, and LCP pigments, and mixtures thereof.

In order additionally to increase the light, water and weather stability of the pigments, it is frequently advisable, depending on the area of application, to subject the effect pigment to aftercoating or aftertreatment. Suitable aftercoating or aftertreatment methods are, for example, the methods described in German Patent 22 15 191, DE-A 31 51 354, DE-A 32 35 017 or DE-A 33 34 598. This aftercoating further increases the chemical stability or simplifies handling of the pigment, in particular incorporation into various media. In order to improve the wettability, dispersibility and/or compatibility with the application media, functional coatings comprising $Al_2O_3$ or $ZrO_2$ or mixtures or mixed phases thereof can be applied to the pigment surface. Furthermore, organic or combined organic/inorganic aftercoatings are possible, for example with silanes, as described, for example, in EP 0090259, EP 0 634 459, WO 99/57204, WO 96/32446, WO 99/57204, U.S. Pat. No. 5,759,255, U.S. Pat. No. 5,571, 851, WO 01/92425 or in J. J. Ponjeé, Philips Technical Review, Vol. 44, No. 3, 81 ff. and P. H. Harding J. C. Berg, J. Adhesion Sci. Technol. Vol. 11 No. 4, pp. 471-493.

The proportion of flake-form effect pigments in the pigment granules is generally between 60-90% by weight, preferably between 70-85% by weight, very particularly preferably between 75-80% by weight, based on the granules. The optimum proportions can easily be determined by the person skilled in the art and essentially depend on the particle size of the effect pigments employed, the form factor of the effect pigments and the type of pigment structure.

Particularly preferred pigment granules according to the invention comprise
60-90% by weight of one or more effect pigments
5-30% by weight of polymer particles
1-30% by weight of adhesion promoters
0.1-10% by weight of additives
0.01-5% by weight of antioxidant,
based on the pigment granule recipe as a whole, where the total proportion of all components in the granules is 100% by weight.

The highest possible content of effect pigments or the lowest possible content of polymer particles is desirable in order to introduce as little foreign material as possible into the application medium to be pigmented, for example a plastic. However, sufficient support material must be used in order to ensure the desired properties of the pigment granules according to the invention, such as, for example, non-dusting behaviour, improved flowability or higher throughput during masterbatch preparation. To this end, the polymer particles must not only be sheathed with the effect pigment, but must also be stuck to one another to form a readily free-flowing coarse "powder".

The dangerous spontaneous heating of pigment granules comprising a polymer and an effect pigment is reduced by the addition of an antioxidant, meaning that classification as a hazardous material in accordance with test method N.4, described in Chapter 33.3.1.6 of the Recommendations on the Transport of Dangerous Goods, Manual of Tests and Criteria, is unnecessary.

All antioxidants known to the person skilled in the art are suitable for the present invention so long as they are compatible with the adhesion promoter. The antioxidants hinder or prevent thermally induced oxidation of the adhesion promoters in the application media, such as, for example, in surface coatings and plastics. They prevent the formation of free radicals, which would be formed by heating in the presence of oxygen, and at the same time prevent discoloration and/or modification of the mechanical properties of the application media, such as, for example, plastics and surface coatings.

Preferred antioxidants are selected from the group of the
lactone/phospite mixtures
lactone/phospite/phenol mixtures
phenol/phosphite mixtures
phosphites
phenols.

Particularly preferred antioxidants are selected from the group
tetrakis[methylene-3-(3,5-di-tert-butyl-4-hydroxyphenyl propionate)]methane
n-octadecyl β-(4-hydroxy-3,5-di-tert-butylphenyl)propionate
N,N'-bis(3,5-di-butyl-4-hydroxylphenylpropionyl)hydrazine
N,N'-hexane-1,6-diylbis[3-(3,5-di-tert-butyl-4-hydroxyphenyl)propionamide]
tris(3,5-di-tert-butyl-4-hydroxybenzyl) isocyanurate
tri(2,4-di-tert-butylphenyl) phosphite
bis(2,4-di-t-butylphenyl)pentaerythritol diphosphite
triphenyl phosphite
trisnonylphenyl phosphite
diphenyl isodecyl phosphite
diisodecyl phenyl phosphate
diisooctyl phenyl phosphite
diphenyl isooctyl phosphate
phosphoric acid alkyl/aryl ester
bisphenol A phosphite
dilauryl thiodipropionate
distearyl thiodipropionate
butyl- and octyldiphenylamine
dinonyldiphenylamine
4,4'-bis(alpha,alphadimethylbenzyl)diphenylamine
4,4'-dioctyldiphenylamine
mixture of tetrakis[methylene-3-(3,5-di-tert-butyl-4-hydroxyphenyl propionate)]methane and tri(2,4-di-tert-butylphenyl) phosphite (weight ratio 1:1)
mixture of tetrakis[methylene-3-(3,5-di-tert-butyl-4-hydroxyphenyl propionate)]methane and tri-(2,4-di-tert-butylphenyl) phosphite (weight ratio 1:2)
mixture of tetrakis[methylene-3-(3,5-di-tert-butyl-4-hydroxyphenyl propionate)]methane and tri(2,4-di-tert-butylphenyl) phosphite (weight ratio 1:3)
mixture of tetrakis[methylene-3-(3,5-di-tert-butyl-4-hydroxyphenyl propionate)]methane and tri(2,4-di-tert-butylphenyl) phosphite (weight ratio 1:4)
mixture of n-octadecyl-3-(4-hydroxy-3,5-di-tert-butylphenyl) propionate and tri(2,4-di-tert-butylphenyl) phosphite (weight ratio 1:1).

Antioxidants having this chemical composition are commercially available, for example from Ciba Specialty Chemicals:
IRGANOX® 1010, IRGANOX® 1076, IRGANOX® 245: phenols
IRGANOX® B 225: phenol/phosphite mixture
IRGANOX® XP 620: phenol/phosphite/phenol mixture
IRGAFOS® 168, IRGASFOS® 126: phosphites
IRGAFOS® XP 60: lactone/phosphite mixture.

The pigment granules according to the invention preferably comprise 0.1-5% by weight, in particular 0.1-1.5% by weight, very particularly preferably 0.5-1% by weight, of antioxidant, based on the pigment granules.

In a further embodiment, the pigment granules according to some embodiments of the invention may comprise further additives and/or assistants, as are usual for use in application media from the areas of surface coatings, paints, powder coatings, plastics. Additives and/or assistants of this type can be lubricants, release agents, stabilisers, antistatics, accelerators, flame retardants, colorants, flexibilisers and plasticisers (for example diisononyl phthalate), blowing agents, antioxidants, UV absorbers, organic/inorganic fillers, phenol derivatives, surfactants. An overview of the additives and assistants which can be employed is given in Saechtling, Kunststoff Taschenbuch [Pocket Book of Plastics], 27th Edition, Carl Hanser Verlag or by R. Wolf in "Plastics, Additives" in Ullmann's Encyclopedia of Industrial Chemistry, Internet edition, 7th Edition, 2003.

In order to improve the wetting and sliding properties of the pigment granules according to the invention, lubricants and wetting agents based on mixtures of fatty acids/fatty acid esters and plant oils are particularly suitable, such as, for example, commercially available Polytrend 719 OT 0005-BON (Degussa Colortrend B.V.).

The pigment granules according to some embodiments of the invention preferably comprise, as additives, ethylene glycol dimethyl ether, preferably having molecular weights of 200-2000 g/mol and a boiling point of 200-300° C. Suitable polyglycols are commercially available, for example polyglycol DME 200, DME 250, DME 500, DME 1000 or DME 2000 from Clariant.

The pigment granules according to the invention can be prepared relatively easily.

Thus, in accordance with the process according to the invention, the effect pigment(s), for example, can be initially introduced and mixed with at least one adhesion promoter, one or more polymer particles and at least one antioxidant and optionally additives. This process variant is preferred.

However, it is also possible for the effect pigment(s), the polymer particles, the antioxidant and optionally additives to be dispersed into the adhesion promoter(s) and for the adhesion promoter solvent to be evaporated off.

The preferred solvent in the adhesion promoters used is water, furthermore water-miscible organic solvents, for example ethanol or methanol.

In a further embodiment of the process according to the invention, conventional additives can be added to the mixture of flake-form effect pigment, adhesion promoter, antioxidant and polymer particles during the processing of surface coatings and plastics.

The invention also relates to a process for the preparation of the granules according to the invention.

The pigment granules according to the invention are distinguished by the fact that they are readily dispersible in the application medium, in particular readily fusible in the plastic.

For the preparation of the granules, the moist composition comprising one or more effect pigments, one or more polymer particles, adhesion promoters, antioxidant and optionally additives is extruded or compressed into a compact particle shape in other ways known to the person skilled in the art, for example by tabletting, briquetting, pelleting, granulation, spray granulation, fluidised-bed granulation or extrusion, and subsequently dried under precisely controlled conditions. During the drying operation, the solvent content of the granules is reduced continuously.

Depending on the adhesion promoter solvent used, the drying process is carried out at temperatures of 60 to 150° C., preferably 60 to 120° C., and can optionally be carried out under reduced pressure, preferably at 80-100 mbar. The drying duration depends on the batch size of the composition to be dried, throughput during drying thereof and on the solvent used, but is generally 0.5-24 h, preferably 1-18 h. Finally, the granules are optionally classified.

The term "granules" here is taken to mean all possible solid particle shapes, such as, for example, pellets, pearlets, chips, briquettes, tablets, sausages, etc. The particle sizes of the granules are in the range from 0.5 to 150 mm, preferably 0.5 to 20 mm, in particular 0.5 to 6 mm.

The solvent content of the granules is determined during preparation by determining the residual moisture content using a Sartorius model MA 30 moisture analyser, working on the basis of infrared. After prior calibration in accordance with the instruction manual, the water content is determined. In the method, the model MA 30 moisture analyser removes the volatile constituents from the test substance, by warming using infrared radiation, and sets the measured weight loss in relation to the initial weight.

On determination of the water content using the Sartorius model MA 30 moisture analyser, the following parameters are selected in order to find the result:
Sample weight: 4-5 g of unground test substance
Temperature: 135-160° C.
Time setting: 12-20 minutes
Results display: 0-100% (moisture content).

The present invention likewise relates to the use of the pigment granules according to the invention for the direct pigmentation of plastics and surface coatings and for the preparation of masterbatches.

The direct incorporation of the pigment granules according to some embodiments of the invention into the plastic is carried out by mixing the plastic granules and/or powder with the pigment granules. The plastic pigmented with the pigment granules according to some embodiments of the invention is subsequently shaped under the action of heat. Furthermore, further additives and pigments can optionally be added to the plastic granules and/or powder during incorporation of the pigment granules.

The plastic granules and/or plastic powder/pigment mixture are generally prepared by a process in which the plastic granules and/or powder are introduced into a suitable mixer, for example a tumble or rapid mixer, wetted with any additives, and the pigment granules according to the invention are then added and mixed in.

A whole series of plastics, in particular thermoplastics, is suitable for the use of the pigment granules according to the invention. The plastics are preferably nonpolar (olefinic) plastics. Examples of suitable plastics are given, for example, in Saechtling, Kunststoff Taschenbuch [Pocket Book of Plastics], 27th Edition, Carl Hanser Verlag.

Furthermore, the pigment granules according to the invention can also be used in powder coatings.

The pigment granules according to the invention can advantageously be employed, in particular, for the preparation of masterbatches. In this way, the highest demands of pigment dispersal can also be met. Masterbatches can be prepared either continuously or discontinuously, preferably continuously, for example through the use of single- or twin-screw extruders. The use of powders or grit of the respective plastics is advantageous in the preparation of masterbatches. On use of the pigment granules according to the invention in a twin-screw extruder, the throughput can be increased at least by a factor of 2-5, depending on the conditions, compared with the untreated effect pigment. Furthermore, masterbatches having a pigment content of up to 50% by weight, based on the masterbatch, can be prepared using the pigment granules according to the invention in a single-screw extruder.

Given a corresponding choice of the support material, both polar and also nonpolar plastics are suitable as masterbatch basis. There are, for example, graft copolymers which can be employed as support material in effect-pigment compositions according to some embodiments of the invention both in polar and nonpolar (olefinic) plastics. For example, ethylene-acrylic acid copolymers are suitable both for use in polar and nonpolar plastics.

The present invention furthermore relates to the use of the pigment granules according to the invention in masterbatch applications. In the preparation of the masterbatch, the pigment granules according to the invention can be employed as a mixture with plastic powders or as a mixture with plastic granules.

The following examples are intended to explain the invention in greater detail, but without limiting it.

EXAMPLES

Example 1

Preparation of Oxidation-Stable Pigmented Granules (Based on LLDPE Plastic Powder)

The Wax Emulsion
Ultralube V-06070480 (product from KEIM-ADDITEC Surface GmbH) used in the example, consisting of
  42% by weight of oxidised LDPE wax (melting point of the wax 110-125° C.),
  5% by weight of emulsifier based on ethoxylated fatty alcohol,
  52.79% by weight of water,
  0.21% of the phenolic antioxidant Irganox 1010 (Ciba Specialty Chemicals
has the following characteristic values:
polymer particle size: 60-80 nm
pH: 6-7
ionogeneity: non-ionic.

This LDPE wax emulsion serves for the preparation of an LDPE wax emulsion/additive premix.
Preparation of Premix No. 1
In Example 1, 238 g of Ultralube V-06070480 and 120 g of polyglycol DME 500 (polyethylene glycol dimethyl ether 500 from Clariant), which is diluted 1:1 with water in advance, are homogenised for 30 min using an 4-blade stirrer under an IKA laboratory stirrer drive; stirrer name DZM 20, at 1200-1500 rpm.
Preparation of the Granules
For the preparation of the granules, good mixing must be ensured. The mixture is prepared using an Eirich R02 mixer.

700 g of Iriodin® 100 (pearlescent pigment from Merck, $TiO_2$-coated mica pigment) are initially introduced into the mixing container, 145 g of Escorne LL 6201 RQ (=LLD-PE plastic powder/LLD=linear low density; ExxonMobil) having a particle size of 0.8-1.2 mm are subsequently metered in, and 358 g of premix No. 1 are then slowly added, and the mixture is mixed homogeneously for 2 min. at control setting 1 (pan/fluidiser).

The moist pigment/LLDPE polymer/LD-PE adhesion promoter/additive mixture prepared in this way is pelletised in an Eirich TR 04 pelletiser pan, where the size distribution is also set. To this end, 200 g of freshly prepared granules are placed on the pan, and the nominal particle size is established at 200-350 rpm and a tilt angle of 30-40°. When the nominal particle size has been established, the introduction of the entire amount of the water-moist pigment/LLDPE polymer/LDPE adhesion promoter/additive batch in portions is begun.

The nominal size should grow to 2±0.5 mm in the prespecified experiment. In this, portions of between 50-100 g are introduced, which can be added within a short time (1 kg about 10-15 min). Coarser aggregates accumulate in the centre of the "material flow kidney" forming during pelletisation. These are taken up with a small shovel, comminuted by hand and added again.

The moist, granulated mixture is dried for 50-70 min. at 40-60° C. in a fluidised-bed drier. The granules prepared in this way are protectively classified via a sieve having a mesh width of 3 mm.

The pigment granules obtained are abrasion-resistant, dimensionally stable and have extraordinary purity of the pearl effect produced.

The granules obtained can be converted without problems in PE/PP powders or PE/PP granules into a masterbatch having a pigment content of 40-50% in a twin-screw extruder.

Example 2

Preparation of Oxidation-Stable Plastic Granules (Based on LLDPE Plastic Core)

Preparation of Premix No. 2
  238 g of Ultralube V-06070480 and 120 g of polyglycol DME 500 (polyethylene glycol dimethyl ether 500 from Clariant), which is diluted 1:1 with water in advance, is homogenised for 30 min using 4-blade stirrer under an IKA laboratory stirrer drive, stirrer name DZM 20, at 1200-1500 rpm.
Preparation of the Granules
  For the preparation of the granules, good mixing must be ensured. The mixture is prepared using an Eirich R02 mixer.

700 g of Iriodin® 100 (pearlescent pigment from Merck, $TiO_2$-coated mica pigment) are initially introduced into the mixing container, 145 g of Escorne LL 6201 XR (=LLD-PE plastic pellets/LLD=linear low density; ExxonMobil) having a particle size of 1.5-1.7 mm (the particle size is converted from on average 3-4 mm to 1.5-1.7 mm by underwater granulation. This measure is intended to prevent clogging of the extruder nozzles) are subsequently metered in, and 358 g of premix No. 2 are then slowly added, and the mixture is mixed homogeneously for 2 min. at control setting 1 (pan/fluidiser). The moist pigment/LLDPE polymer/LDPE adhesion promoter/additive composition prepared in this way is pelletised in an Eirich TR 04 pelletiser pan, where the size distribution is also set.

To this end, 200 g of freshly prepared granules are placed on the pan, and the nominal particle size is established at 200-350 rpm and a tilt angle of 30-40°. When the nominal particle size has been established, the introduction of the entire amount of the water-moist pigment/LLDPE polymer/LDPE adhesion promoter/additive batch in portions is begun.

The nominal size should grow to 3±0.5 mm in the prespecified experiment. In this, portions of between 50-100 g are introduced, which can be added within a short time (1 kg about 10-15 min). Coarser aggregates accumulate in the centre of the "material flow kidney" forming during pelletisation. These are taken up with a small shovel, comminuted by hand and added again.

The moist, granulated mixture is dried for 50-70 min. at 40-60° C. in a fluidised-bed drier. The granules prepared in this way are protectively classified via a sieve having a mesh width of 5 mm.

The pigment granules obtained are abrasion-resistant, dimensionally stable and have extraordinary purity of the pearl effect produced.

The granules obtained can be converted without problems in PE/PP powders or PE/PP granules into a masterbatch having a pigment content of 40-50% in a twin-screw extruder.

Example 3

Preparation of Non-Oxidation-Stable Pigmented Plastic Granules (Based on LLDPE Plastic Granules)

The Wax Emulsion
Ultralube E-668 H (product from KEIM-ADDITEC Surface GmbH) used in the example, consisting of
 35% by weight of oxidised PP wax (melting point of the wax 154° C.),
 5% by weight of emulsifier based on ethoxylated fatty alcohol,
 60% by weight of water,
has the following characteristic values:
polymer particle size: <100 nm
pH: 8-9
ionogeneity: non-ionic.

This LDPE wax emulsion serves for the preparation of an LDPE wax emulsion/additive premix.
Preparation of Premix No. 3
In the example, 285 g of Ultralube E-668-H (Keim Additec) and 120 g of polyglycol DME 500 (polyethylene glycol dimethyl ether 500 from Clariant; serves as additive), which is diluted 1:1 with water in advance, are homogenised for 30 min using a 4-blade stirrer under an IKA laboratory stirrer drive, stirrer name DZM 20, at 1200-1500 rpm.
Preparation of the Granules
700 g of Iriodin® 100 (pearlescent pigment from Merck, $TiO_2$-coated mica pigment) are initially introduced into the mixing container, 145 g of Escorne LL 6201 XR (=LLD-PE plastic pellets/LLD=linear low density; ExxonMobil) having a particle size of 1.5-1.7 mm (the particle size is converted from on average 3-4 mm to 1.5-1.7 mm by underwater granulation) are subsequently metered in, and 405 g of premix No. 3 are then slowly added, and the mixture is mixed homogeneously for 2 min. at control setting 1 (pan/fluidiser).

The moist pigment/LLDPE polymer/PP adhesion promoter/additive composition prepared in this way is pelletised in an Eirich TR 04 pelletiser pan, where the size distribution is also set. To this end, 200 g of freshly prepared granules are placed on the pan, and the nominal particle size is established at 200-350 rpm and a tilt angle of 30-40°. When the nominal particle size has been established, the introduction of the entire amount of the water-moist pigment/LLDPE polymer/PP adhesion promoter/additive batch in portions is begun.

The nominal size should grow to 3±0.5 mm in the prespecified experiment. In this, portions of between 50-100 g are introduced, which can be added within a short time (1 kg about 10-15 min). Coarser aggregates accumulate in the centre of the "material flow kidney" forming during pelletisation. These are taken up with a small shovel, comminuted by hand and added again.

The moist, granulated mixture is dried for 50-70 min. at 40-60° C. in a fluidised-bed drier. The granules prepared in this way are protectively classified via a sieve having a mesh width of 5 mm.

The pigment granules obtained are abrasion-resistant, dimensionally stable and have extraordinary purity of the pearl effect produced.

The granules obtained can be converted without problems in PE/PP powders or PE/PP granules into a masterbatch having a pigment content of 40-50% in a twin-screw extruder.

Example 4

Preparation of Non-Oxidation-Stable Pigmented Plastic Granules (Based on LLDPE plastic powder)

The Microwax Dispersion
Ultralube MD2011 (product from KEIM-ADDITEC Surface GmbH) used in the example, consisting of
 40% by weight of oxidised HDPE wax (melting point of the wax 128° C.),
 5% by weight of emulsifier based on ethoxylated fatty alcohol,
 55% by weight of water,
has the following characteristic values:
polymer particle size: 0.4-4 μm
pH: 3-4
ionogeneity: non-ionic.

This HDPE microwax dispersion serves for the preparation of an HDPE microwax dispersion/additive premix.
Preparation of Premix No. 4
In the example, from 250 g of Ultralube MD 2011 and 120 g of polyglycol DME 500 (polyethylene glycol dimethyl ether 500 from Clariant; serves as additive), which is diluted 1:1 with water in advance, are homogenised for 30 min using 4-blade stirrer under an IKA laboratory stirrer drive, stirrer name DZM 20, at 1200-1500 rpm.
Preparation of the Granules
For the preparation of the granules, good mixing must be ensured. The mixture is prepared using an Eirich R02 mixer.
700 g of Iriodin® 100 (pearlescent pigment from Merck, $TiO_2$-coated mica pigment) are initially introduced into the mixing container, 145 g of Escorne LL 6201 RQ (=LLD-PE plastic powder/LLD=linear low density; ExxonMobil) having a particle size of 0.8-1.2 mm are subsequently metered in, and 370 g of premix No. 4 are then slowly added, and the mixture is mixed homogeneously (pan/fluidiser).

The moist pigment/LLDPE plastic powder/HD-PE adhesion promoter/additive mixture prepared in this way is pelletised in an Eirich TR 04 pelletiser pan, where the size distribution is also set. To this end, 200 g of freshly prepared granules are placed on the pan, and the nominal particle size is established at 200-350 rpm and a tilt angle of 30-40°. When the nominal particle size has been established, the introduction of the entire amount of the water-moist pigment/polymer/HDPE adhesion promoter/additive batch in portions is begun. The nominal size should grow to 2±0.5 mm in the prespecified experiment. In this, portions of between 50-100 g are introduced, which can be added within a short time (1 kg about 10-15 min). Coarser aggregates accumulate in the centre of the "material flow kidney" forming during pelletisation. These are taken up with a small shovel, comminuted by hand and added again. The moist, granulated mixture is dried for 50-70 min. at 40-60° C. in a fluidised-bed drier.

The granules prepared in this way are protectively classified via a sieve having a mesh width of 3 mm. The pigment granules obtained are abrasion-resistant, dimensionally stable and have extraordinary purity of the pearl effect produced.

The granules obtained can be converted without problems in PE/PP powders or PE/PP granules into a masterbatch having a pigment content of 40-50% in a twin-screw extruder.

In order to test the spontaneous heating behaviour of the granules in accordance with Examples 1 and 2, test method N.4, described in Chapter 33.3.1.6. of the Recommendations on the Transport of Dangerous Goods, Manual of Tests and Criteria, is used. Tests are carried out in wire baskets having the edge lengths of 25 mm and 100 mm at temperatures of 140° C. in order to test whether spontaneous combustion or dangerous spontaneous heating occurs. The limiting criterion here is an increase in temperature by at least 60 K above the oven temperature within 24 h.

Test 1:
Testing of the composition in accordance with Example 1+2 at 140° C. in the 100 mm wire basket: negative Test 2:
Testing of the composition in accordance with Example 1+2 at 140° C. in the 25 mm wire basket: negative Test 3:
Testing of the composition in accordance with Example 3+4 at 140° C. in the 100 mm wire basket: positive Test 4:
Testing of the composition in accordance with Example 3+4 at 140° C. in the 25 mm wire basket: positive The addition of the antioxidant in the adhesion-promoter emulsion prevents spontaneous heating.

The addition of the antioxidant during emulsification produces finer and more effective dispersal compared with the addition of the antioxidant to a melt of a plastic powder.

No pigment composition in accordance with Examples 1-2 should be classified as a class 4.2 hazardous material.

The melting point of the waxes employed in the emulsions used is determined by means of the Mettler drop point analogously to ASTM D3954.

Although the invention is described herein with reference to specific embodiments, the invention is not intended to be limited to the details shown. Rather, various modifications may be made in the details within the scope and range of equivalents of the claims and without departing from the invention.

The invention claimed is:

1. Pigment granules comprising one or more flake-form effect pigments, polymer particles or polymer particle mixtures, at least one adhesion promoter, at least one antioxidant and at least one additive,
    wherein the one or more flake-form effect pigments comprise a support coated with one or more layers selected from the group consisting of transparent layers, semitransparent layers, opaque layers, and a combination thereof,
    wherein the pigment granules comprise
    60-90% by weight of the one or more effect pigments,
    5-30% by weight of the polymer particles or polymer particle mixtures,
    1-30% by weight of the at least one adhesion promoter,
    0.1-10% by weight of the additives, and
    0.01-5% by weight of the at least one antioxidant,
    based on the pigment granules,
    where the total proportion of all components in the granules is 100% by weight.

2. The pigment granules according to claim 1, wherein the one or more effect pigments are selected from the group consisting of pearlescent pigments, interference pigments, metal-effect pigments, multilayered pigments, and mixtures thereof.

3. The pigment granules according to claim 1, wherein the polymer particles consist of polyolefins.

4. The pigment granules according to claim 1, wherein the polymer particles consist of polyethylene (PE) or polypropylene (PP).

5. The pigment granules according to claim 1, wherein the polymer particles consist of LD-PE or LLD-PE.

6. The pigment granules according to claim 1, wherein the polymer particles have particle sizes of 1-5 mm.

7. The pigment granules according to claim 1, wherein the at least one adhesion promoter is a wax emulsion.

8. The pigment granules according to claim 1, wherein the at least one adhesion promoter is an HD-PE, LD-PE, LLD-PE, VLD-PE or PP wax emulsion.

9. The pigment granules according to claim 1, wherein a proportion of the at least one adhesion promoter, based on the pigment composition, is 1-20% by weight.

10. The pigment granules according to claim 1, wherein the granules comprise one or more additives selected from the group consisting of lubricants and wetting agents.

11. The pigment granules according to claim 1, wherein the at least one antioxidant is selected from the group consisting of
    lactone/phospite mixtures,
    lactone/phospite/phenol mixtures,
    phenol/phosphite mixtures,
    phosphites,
    phenols,
    and a mixture thereof.

12. The pigment granules according to claim 1, wherein the granules additionally comprise inorganic fillers, dyes, organic coloured pigments, inorganic coloured pigments, or mixtures thereof.

13. A process for the preparation of the pigment granules according to claim 1 comprising mixing the one or more flake-form effect pigments, the one or more polymer particles or polymer particle mixtures, the at least one adhesion promoter, the at least one antioxidant and optionally the one or more additives with one another simultaneously or successively.

14. A method for the pigmentation of powder coatings or plastics comprising mixing the powder coatings or plastics with the pigment granules of claim 1.

15. The method for the pigmentation of claim 14, wherein the pigment granules are mixed with powders or granules of the plastics to provide a masterbatch.

* * * * *